(12) United States Patent
Leisure

(10) Patent No.: US 8,015,036 B1
(45) Date of Patent: Sep. 6, 2011

(54) AUTOMATED CLAIM MEDIATION SYSTEM AND ASSOCIATED METHODS

(75) Inventor: Rebecca O. Leisure, Tampa, FL (US)

(73) Assignee: ClaimAssistant.com, LLC, Tampa, FL (US)

( * ) Notice: Subject to any disclaimer, the term of this patent is extended or adjusted under 35 U.S.C. 154(b) by 313 days.

(21) Appl. No.: 12/059,173

(22) Filed: Mar. 31, 2008

Related U.S. Application Data

(60) Provisional application No. 60/909,547, filed on Apr. 2, 2007.

(51) Int. Cl.
*G06Q 40/00* (2006.01)

(52) U.S. Cl. .................. 705/4; 705/1; 705/37

(58) Field of Classification Search .............. None
See application file for complete search history.

(56) References Cited

U.S. PATENT DOCUMENTS

| | | | |
|---|---|---|---|
| 5,956,687 A * | 9/1999 | Wamsley et al. | 705/2 |
| 6,330,551 B1 | 12/2001 | Burchetta et al. | |
| 6,850,918 B1 | 2/2005 | Burchetta et al. | |
| 6,954,741 B1 | 10/2005 | Burchetta et al. | |
| 7,249,114 B2 | 7/2007 | Burchetta et al. | |
| 2001/0037204 A1 * | 11/2001 | Horn et al. | 705/1 |
| 2002/0022976 A1 * | 2/2002 | Hartigan | 705/4 |
| 2002/0069182 A1 * | 6/2002 | Dwyer | 705/80 |
| 2004/0210540 A1 * | 10/2004 | Israel et al. | 705/80 |
| 2005/0075912 A1 * | 4/2005 | Bealke et al. | 705/4 |
| 2005/0246206 A1 * | 11/2005 | Obora et al. | 705/4 |
| 2006/0116914 A1 * | 6/2006 | Stemple | 705/4 |
| 2006/0176365 A1 * | 8/2006 | Reisch et al. | 348/14.09 |
| 2006/0253351 A1 * | 11/2006 | Keaney | 705/35 |
| 2007/0150377 A1 * | 6/2007 | Burchetta et al. | 705/27 |
| 2008/0046261 A1 * | 2/2008 | Cunningham | 705/1 |
| 2008/0154783 A1 * | 6/2008 | Rule et al. | 705/80 |
| 2008/0267487 A1 * | 10/2008 | Siri | 382/141 |

OTHER PUBLICATIONS

"Equity holders oppose Manville's amended Ch. 11." Daily News Record. Conde Nast Publications, Inc. 1986. HighBeam Research. Apr. 25, 2010 <http://www.highbeam.com>.*
"Added coverage: Those with assets worth protecting should consult experts." The Dallas Morning News (Dallas, TX). McClatchy-Tribune Information Services. 2005. HighBeam Research. Apr. 25, 2010 <http://www.highbeam.com>.*
"Comptroller Thompson: City Pays $496.4 Million to Settle Claims in FY 2006." US Fed News Service, Including US State News. HT Media Ltd. 2007. HighBeam Research. Apr. 25, 2010 <http://www.highbeam.com>.*
Persuasion in settlement negotiations; 92 pages http://www.howardnations.com/settlement/Settlmnt.pdf.*
State of Wisconsin before the Mediator/Arbitrator Case 15 No. 38104 Decision No. 24341-A 17 pages http://werc.wi.gov/interest_awards/int_pre-99_vol_2_of_2/int24341.pdf.*
State of Minnesota in Court of Appeals c5-00-1; Danil J Drake et al Vs Reile's Transfer and Delivery inc and Minnesota's Workers Compensation Assigned Risk Plan . . . : Becker County District Court; File No. C99695 at www.lawlibrary.state.mn.us/archive/ctappub/0007/c5001.htm- 6 pages.*

* cited by examiner

*Primary Examiner* — Shahid R Merchant
*Assistant Examiner* — Mary Gregg
(74) *Attorney, Agent, or Firm* — Jacqueline E. Hartt; Gray Robinson, P.A.

(57) ABSTRACT

An improved claim mediation process includes an automated feature permitting a software package to act as the mediator based upon a predetermined rule set. Open offers are made by both sides, but kept secret from the opposing party are criteria by which the offer can be adjusted and still be acceptable to that party. The system takes into account the open offers and the confidential adjustment criteria and, if possible according to the predetermined rule set, calculates and displays a settlement amount.

20 Claims, 9 Drawing Sheets

FIG. 4

Session Identification

[ User name ]
Session #: 16719
Parties Invoved: [ names ]
Insurance Co,: Peoples Insurance Corporation
DOL: [ date ]
Type Of Session: Mediation
Session Start Date: [ date ]

EDIT

Session Overview:

| Party | Initial Report | Summary Report | Detailed |
|---|---|---|---|
| Insurance Company | VIEW FILE | VIEW FILE | |
| Home Owner | VIEW FILE | ACTION REQUIRED | |

| Policy Coverage | Coverage Limit | Deductible | Prior Pay | Insurance Co. Offer | Policy Holder Offer | Total Award Amount | Net Pay | View Details |
|---|---|---|---|---|---|---|---|---|
| Coverage A | $100,000 | $1,000 | $6,500 | $7,500 | $10,000 | No Award | — | VIEW DETAILS |
| Coverage C | $20,000 | | $2,000 | $3,100 | $3,100 | No Award | — | VIEW DETAILS |

Open Items:

| Coverage Type | Insurance Co. Offer | Policy Holder Offer | Gross Award Amount | Deductible | Prior Payments | Net Payments | Action Required |
|---|---|---|---|---|---|---|---|
| Coverage A | $7,500 | $9,500 | $8,500 | $9,500 | $10,000 | No Award | ACTION REQUIRED |
| Open Items | $7,500 | $1,000 | $8,500 | $9,500 | $3,100 | No Award | ACTION REQUIRED |

Resolved Items:

| Coverage Type | Insurance Co. Offer | Policy Holder Offer | Gross Award Amount | Deductible | Prior Payment | Net Payment |
|---|---|---|---|---|---|---|
| Coverage C | $7,500 | $9,500 | $8,500 | $9,500 | $1,000 | $1,500 |
| Open Items | $7,500 | $1,000 | $8,500 | $6,500 | $1,500 | $1,500 |

VIEW GUEST LIST   INVITE A GUEST

AUTOMATED CLAIM MEDIATION SYSTEM AND ASSOCIATED METHODS

CROSS-REFERENCE TO RELATED APPLICATION

This application claims priority to provisional application 60/909,547, filed Apr. 2, 2007.

BACKGROUND OF THE INVENTION

1. Field of the Invention

The present invention relates to systems and methods for settling claims between parties, and, more particularly, to such systems and methods for settling insurance claims between a claimant and an insurance company.

2. Description of Related Art

When a claim is made to an insurance company for damage to property, for example, typically an insurance adjustor evaluates the damage and makes an offer of a monetary compensation based upon the owner's policy and an estimate of the cost to repair or replace the damaged item.

If the claimant is not satisfied with the insurance company's offer, the only recourse available is to bring an action against the insurance company, which can lead to mediation, arbitration, or full-scale litigation. To a greater or lesser degree, all of these options are costly, since they all involve paying fees to highly trained professionals (mediators, arbitrators, lawyers, etc.).

Therefore, it would be desirable to provide a system that can mediate a disputed claim between the owner and the insurance company in a more timely, efficient, and cost-effective manner.

SUMMARY OF THE INVENTION

The present system and method address the above-described need for an improved claim mediation process that includes an automated feature permitting a software package to act as the mediator based upon a predetermined rule set. Open offers are made by both sides, but kept secret from the opposing party are criteria by which the offer can be adjusted and still be acceptable to that party. The system takes into account the open offers and the confidential adjustment criteria and, if possible according to the predetermined rule set, calculates and displays a settlement amount.

In particular, the method for automatically settling an insurance claim made by a claimant and an insurer comprises receiving claims data from a claimant and an insurer. The claims data comprise an initial settlement offer and a confidential best offer for damage to an insured item. If the confidential best offers of the claimant and the insurer overlap, a settlement amount within a range between the initial settlement offers and the confidential best offers of the claimant and the insurer is calculated and displayed to the claimant and the insurer.

If the confidential best offers of the claimant and the insurer do not overlap, the system calculates from a breakdown of a plurality of elements comprising the claims data, each having associated therewith an initial settlement offer and a confidential best offer, if the confidential best offers for an element overlap, in which case a first element settlement amount within a range between the initial settlement offers and the confidential best offers for the element is automatically calculated and displayed to the claimant and the insurer and remaining elements for which the confidential offers do not overlap.

At least one of the claimant and the insurer submit a revised offer for at least one of the remaining elements. If the revised offer overlaps with the confidential best offer of the other of the claimant and the insurer, a second element settlement amount within a range between the revised offer and the confidential best offer of the other of the claimant and the insured for the element is automatically calculated and displayed to the claimant and the insurer.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

Figure 4:
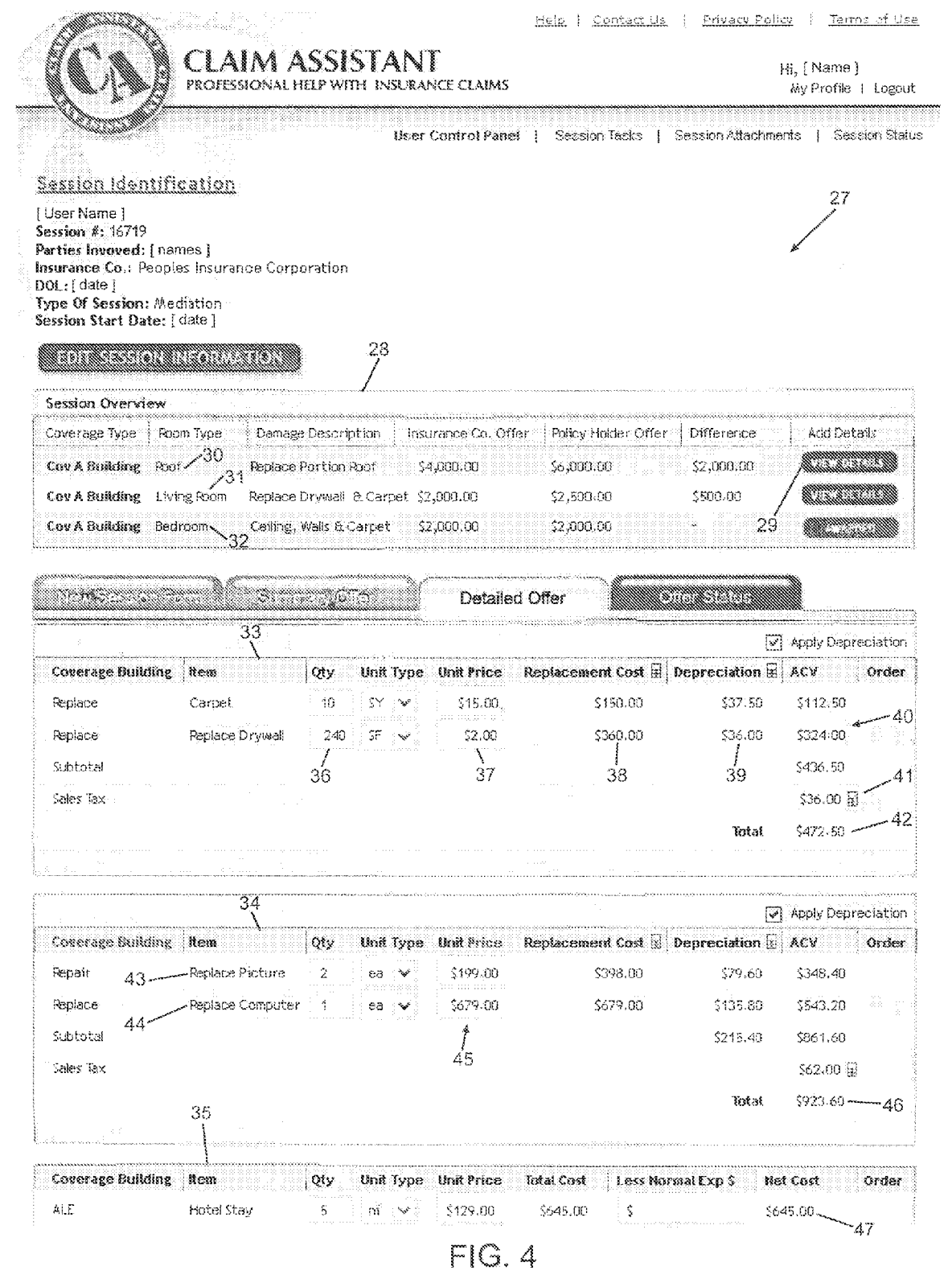

FIG. 4 is an exemplary screen for displaying detailed offer data.

FIG. 5 is an exemplary screen for displaying status of a detailed estimate.

Figure 6:
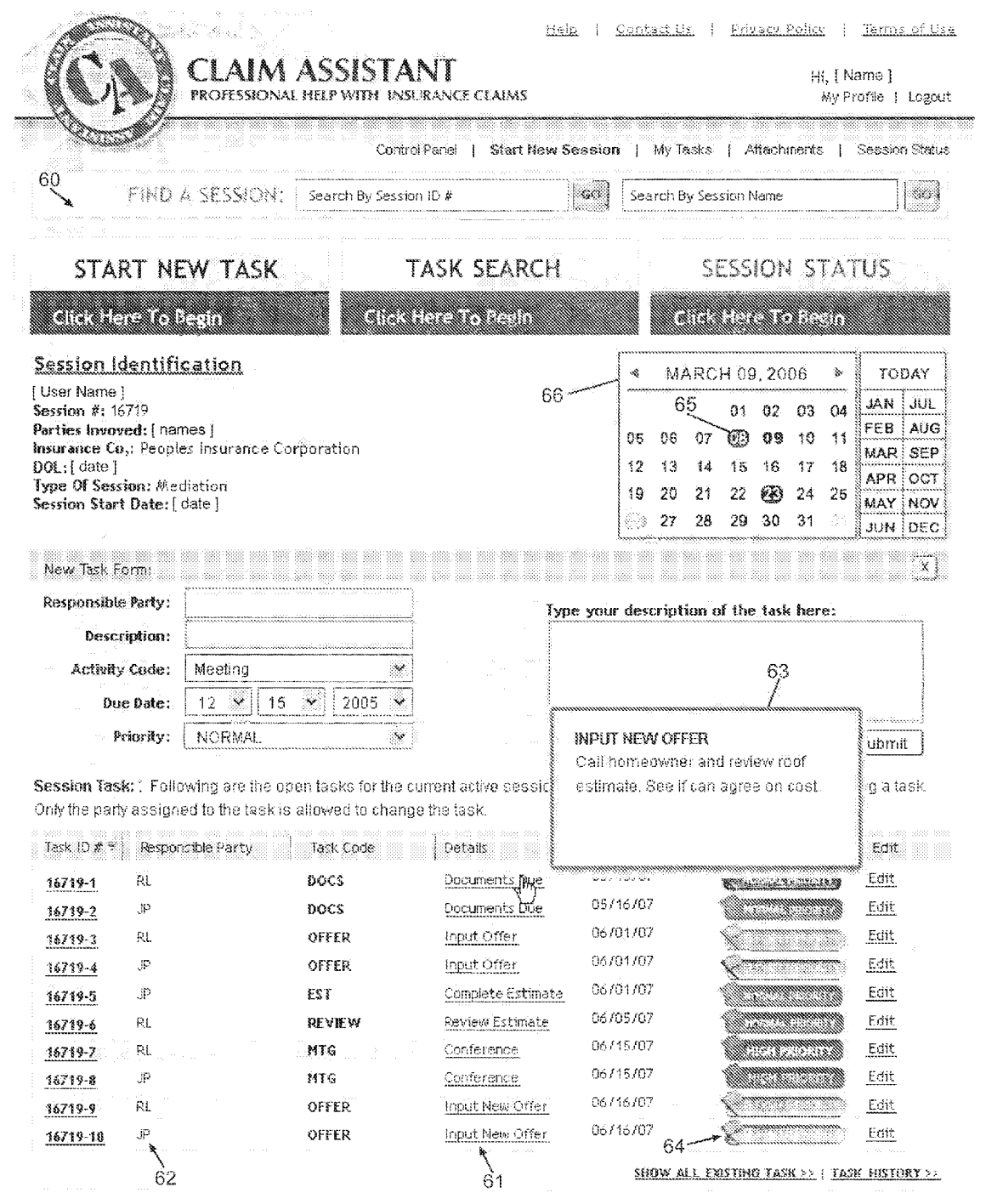

FIG. 6 is an exemplary screen for initiating a new task.

Figure 7:
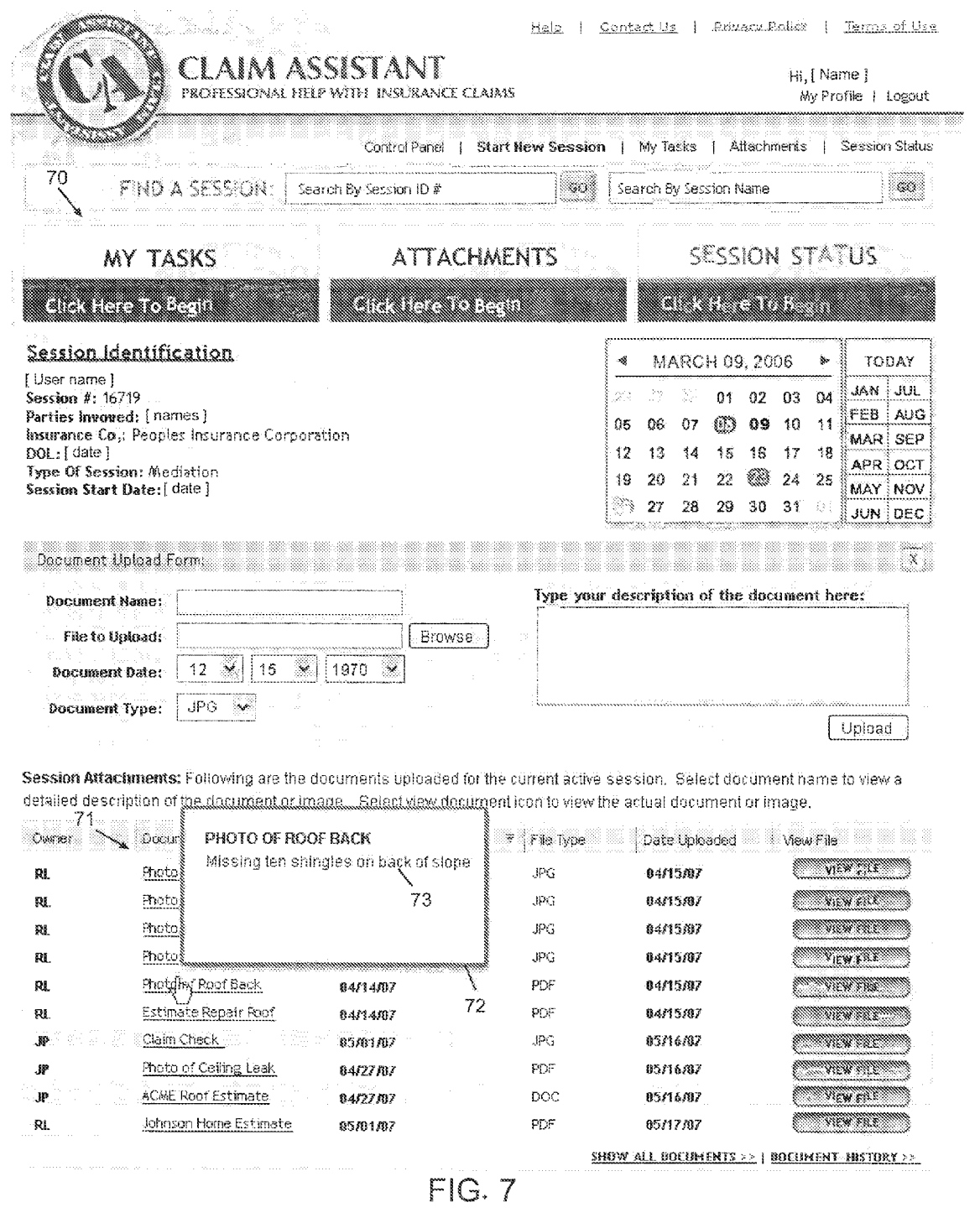

FIG. 7 is an exemplary screen for uploading documents.

DETAILED DESCRIPTION OF THE PREFERRED EMBODIMENTS

Figure 1A:
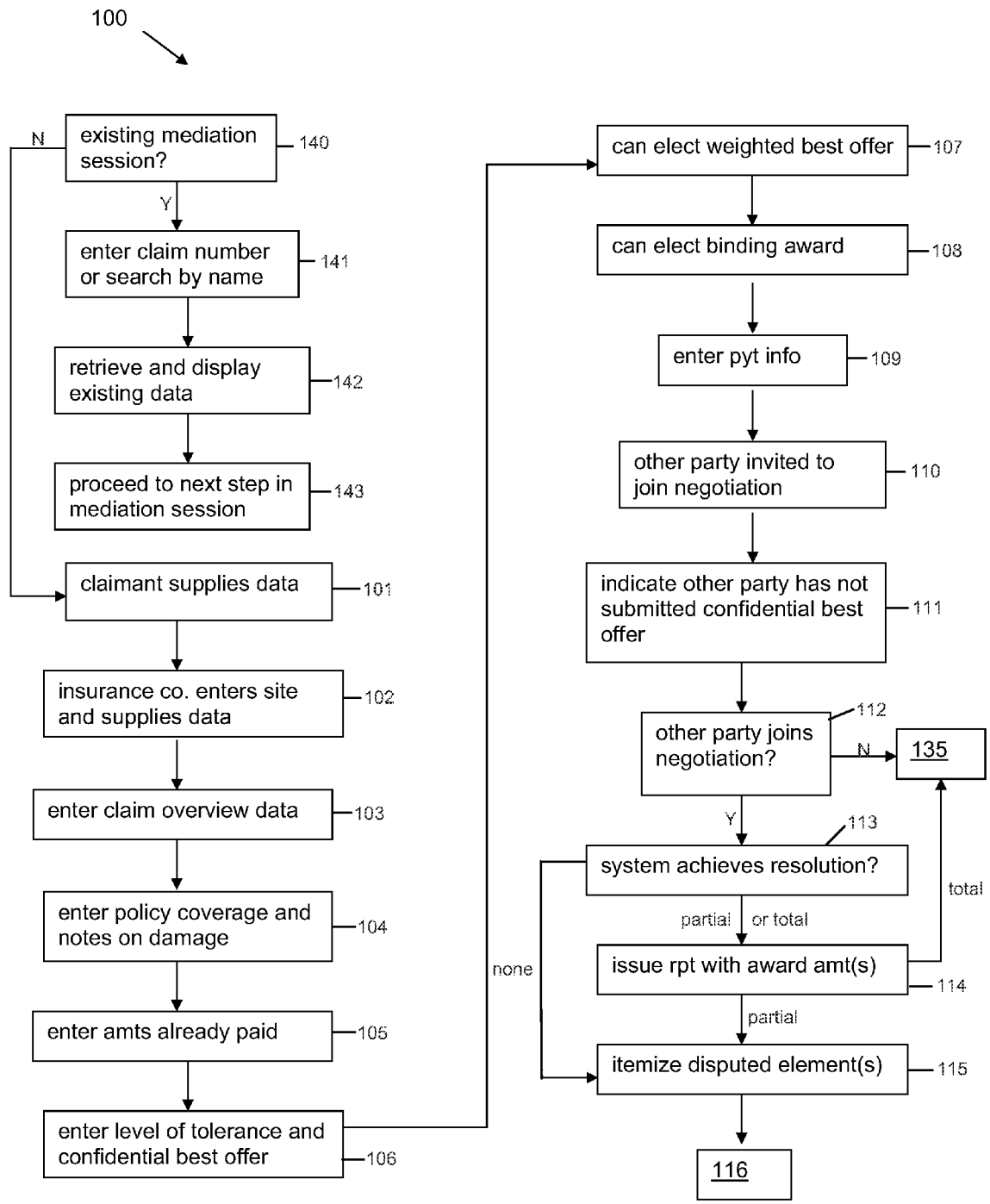
FIGS. 1A,1B is a flowchart of an exemplary method of the present invention.
Figure 1B:
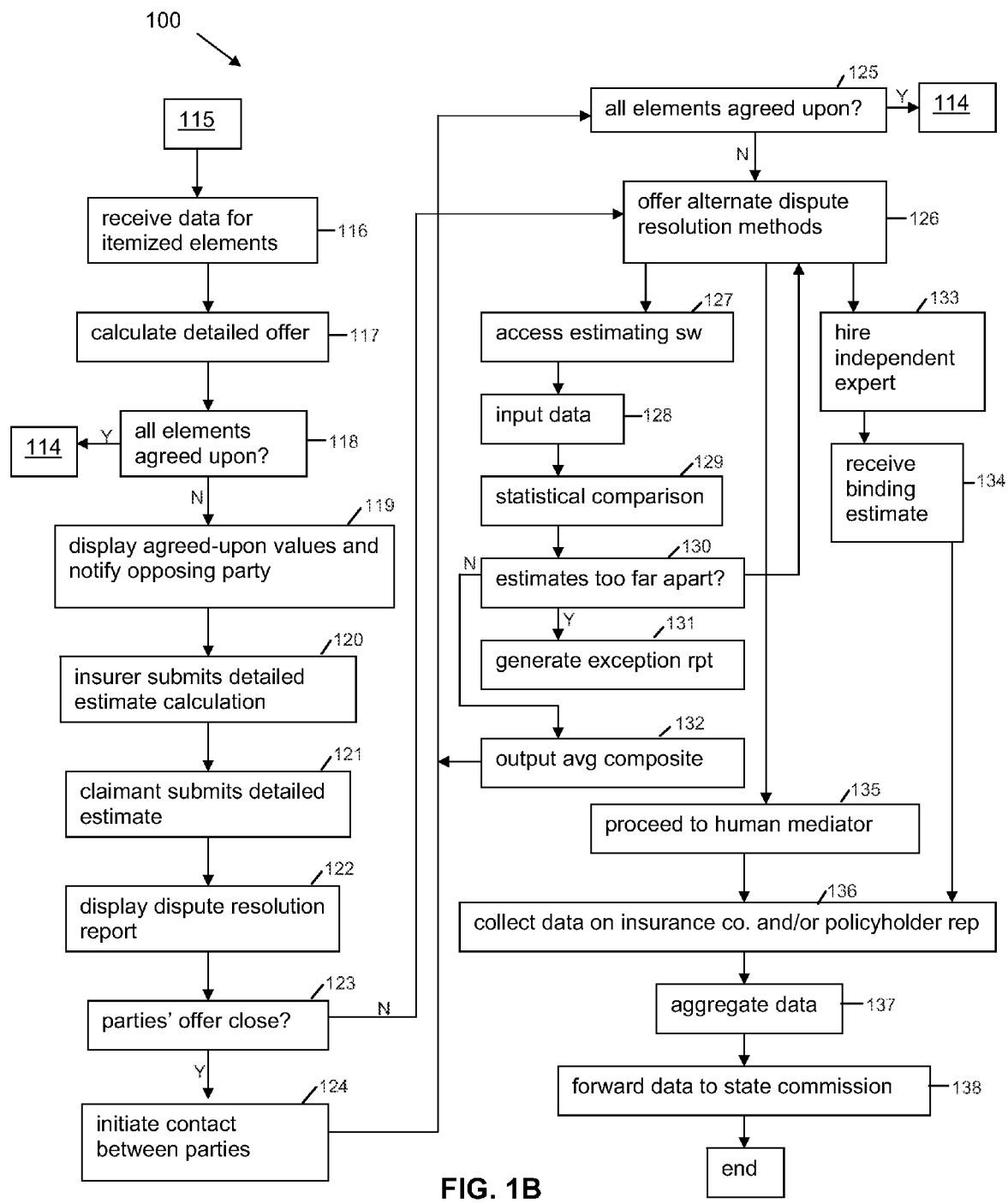
Figure 2:
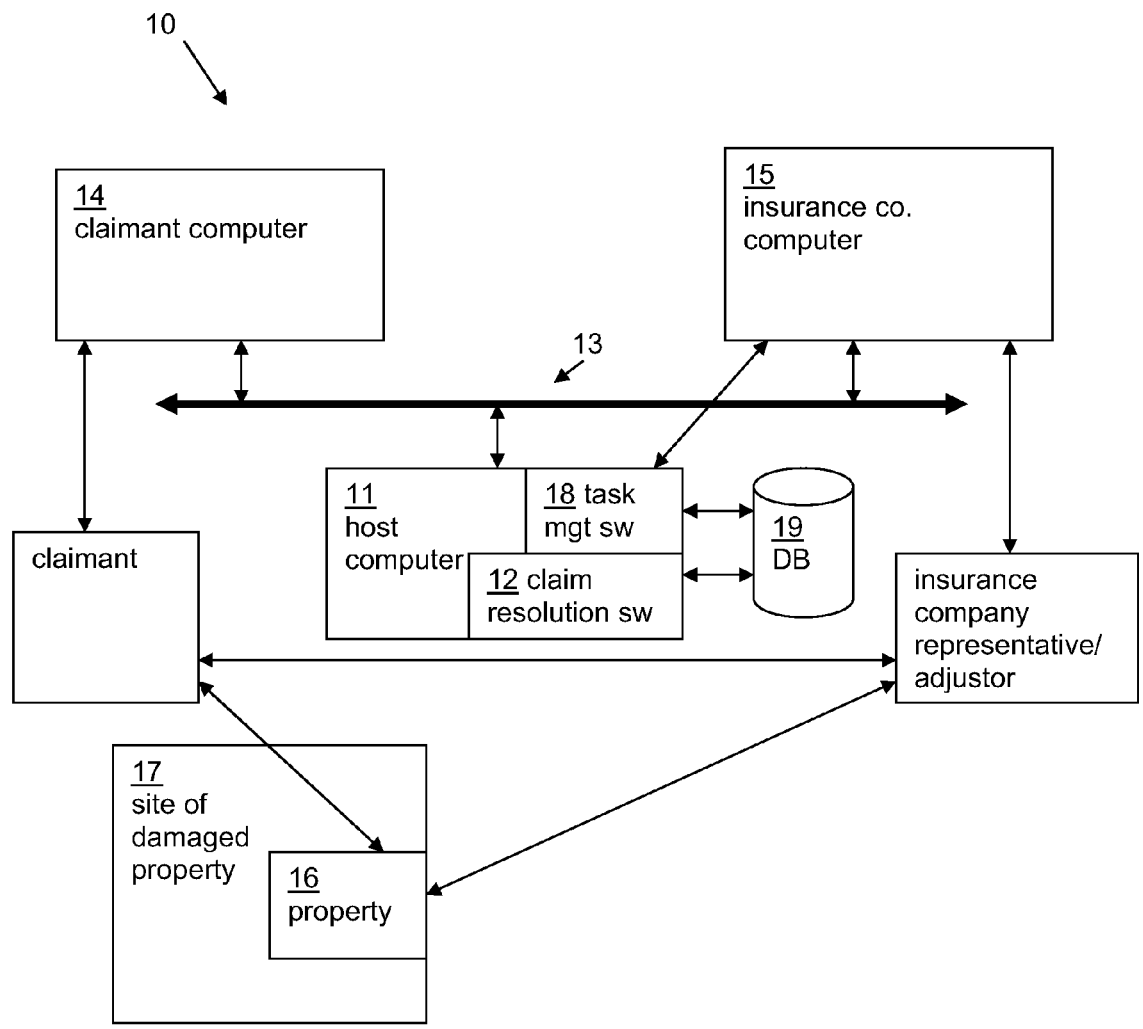
FIG. 2 is an exemplary schematic of the system of the present invention.

A description of the preferred embodiments of the present invention will now be presented with reference to FIGS. 1A-8.

Embodiments of the system 10 (FIG. 2) and method 100 (FIGS. 1A,1B) of the present invention are directed to an automated process for settling insurance claims, or for assisting in establishing the status of the claim elements for subsequent negotiations between the parties. The system 10 includes a host computer 11 having a software package 12 resident thereon for performing at least some of the method steps to be described herein. The host computer 11 can establish communication, for example, over the Internet 13, with a claimant computer 14 and an insurance company computer 15, which can all be at different sites. The property 16 under dispute can be at yet another site 17, or collocated with the claimant computer 14.

The method 100 of the present invention, which is at least partially mediated by the software package 12, includes the steps of a claimant (block 101) and a party representing an insurance company (block 102) signing onto a website established for interacting with the parties mediated by the software package 12. Appropriate demographic data, such as name and contact information, are entered into a parties information screen. Also selectable from a drop-down menu are the type of session, such as an appraisal, and the respective role of each participant (e.g., claimant or insurance company representative). If the interaction concerns a claim mediation session already in progress (block 140), the claim number can be entered (block 141), which will trigger the retrieval and display of existing data on that claim (block 142) from a database 19 and a prompt for whatever the next step in the sequence will be (block 143). Alternatively, if the claim number is not used, the session can be searched for by name.

Claim overview information (block 103) can be entered on another screen, such as insurance company, policy holder, property address, and claim information, as well as a narrative description of the claim substance.

Next the policy coverage data are entered on a screen (block 104), which can include policy type, coverage limit, special limitation, and deductible. Notes on the damage believed to be covered by each policy type (e.g., building, contents, etc.) are entered under a "notes" field.

On another screen can be entered an amount for each policy type that has been paid already to the claimant by the insurance company (block 105). A summary screen can summarize the policy types, coverage limits, deductibles, and the amounts already paid. In addition, in a particular embodiment, the user can identify a level of tolerance (e.g., percentage) that would be acceptable in their offer, a current offer, and a "confidential best offer," which is kept secret from the other party and may be used subsequently by the software 12 to arrive at a mediated settlement amount (block 106).

In a particular embodiment, the user is permitted to agree to accept a "weighted best offer" (block 107), an acceptance of which indicates an agreement that, at the end of the appraisal, an adjustment can be made to a "raw" settlement amount with an increase or reduction occurring in favor of the party whose initial offer was closest to the settlement amount.

The user is also permitted to agree to accept a "binding award" (block 108), an acceptance of which indicates an agreement that a negotiated settlement mediated by the system 10 will be binding.

Payment information can also be entered for using the system 10 of the present invention (block 109). When one of the parties has completed the new session initiation process, the other party is notified and invited to join the negotiation (block 110). A dispute resolution report is displayed that includes a claim number and the information that the other party has not yet submitted a confidential best offer (block 111).

If and when the other party joins in the negotiation process (block 112), and if the system's rule set is able to negotiate an award for at least one of the policy types that meets the criteria entered by both parties based, for example, upon the confidential best offers of the parties (block 113), another dispute resolution report is displayed that indicates the policy type and award amount settled upon (block 114). Both parties typically must indicate agreement to accept the settlement amount. If any of the policy types has not been able to be settled, it is listed as an "open item." For example, in a case of exterior and interior building damage, a settlement could be reached on the building contents and computer damage, but not on the building damage to the roof, ceiling, walls, and windows.

Figure 3:
FIG. 3 is an exemplary screen for displaying an itemized tabulation of disputed items.
Figure 8:
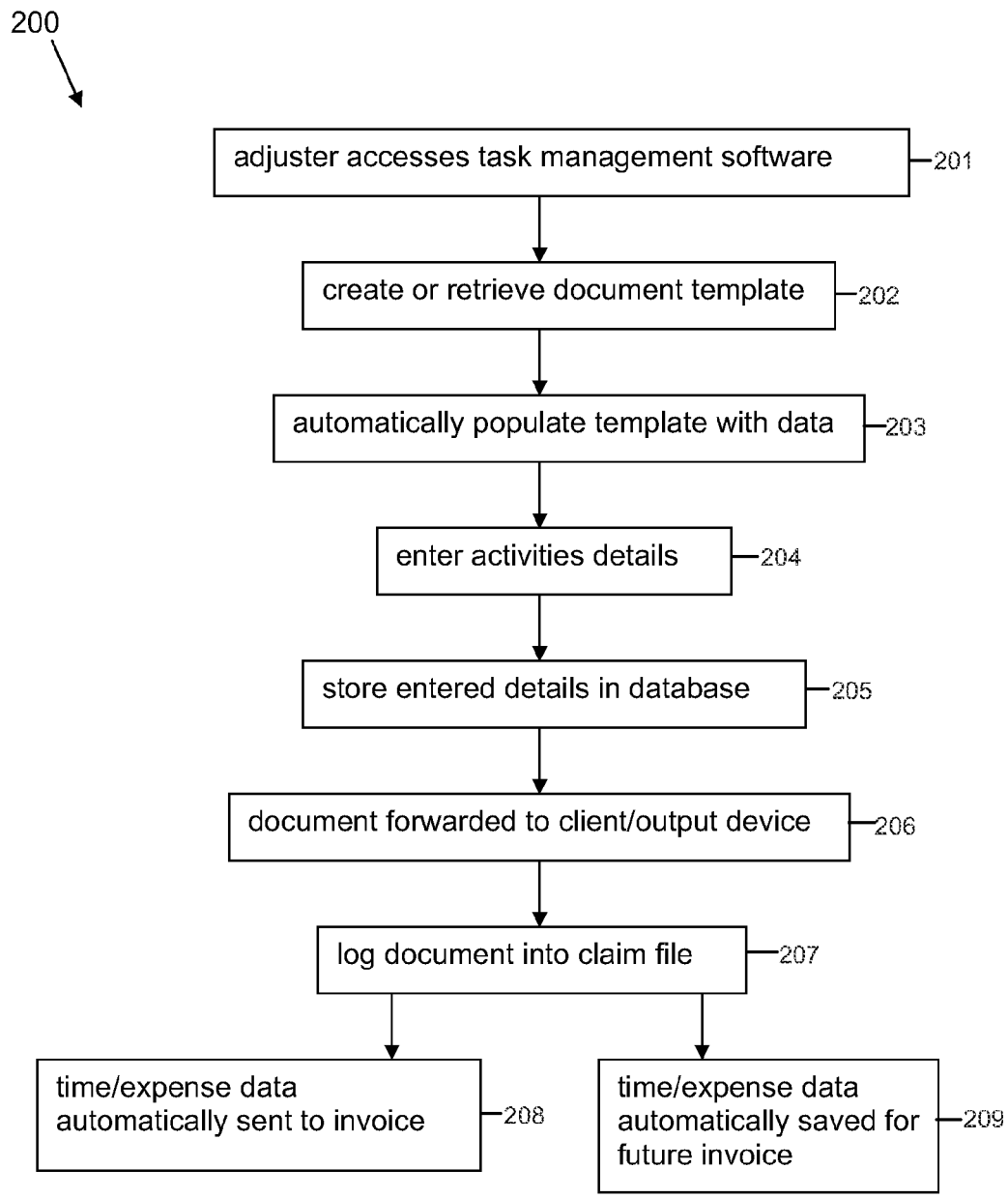
FIG. 8 is a flowchart for an exemplary task management system for use by claim adjusters.

An itemized tabulation of the disputed items can be given in a screen 21 such as that illustrated in FIG. 3, in this case breaking down each of the rooms 22 or areas 23 (e.g., roof) in the house where damage has occurred (block 115), a description 24 of the damage, the amount of damage 25, and the confidential best offer for each item 26.

A detailed offer screen 27 (FIG. 4) displays an overview 28 of the current results, which can be amplified upon by selecting to view details 29. In this case, a settlement for the roof 30 and living room 31 are still under dispute, but the bedroom (ceilings, walls, and carpet) 32 has been settled and awarded. However, structural elements 33, contents 34, and living expenses 35 have not been agreed upon. Here particulars of the damage and replacement or repair costs can be entered (block 116). Note, for example, that the square footage 36 of drywall needing replacement can be entered, along with a unit price 37 for doing so. The system 10 calculates replacement cost 38 from these values and depreciation 39 to reach a value 40 being requested, including automatically adding sales tax 41 and total 42 (block 117). Item contents 34 such as artwork 43 and computer 44 can also be included, with unit price 45 enterable, resulting in another total 46. Housing costs 47 (e.g., hotel) 35 can also be entered. Additional information that can be entered include before and after photographs, scanned estimates from repair companies, and images of receipts.

At any time during the process, the user can view an "offer status" screen 50 (FIG. 5), which permits both sides to view their respective files 51, and notifies the parties as to whether an action is required of them 52. A new action, or task, can be initiated on a screen 60 (FIG. 6) for displaying a list of tasks with codes and details 61, and the party responsible for that task 62. Hovering over the "details" entry 61 (here, "Documents Due") brings up a pop-up box 63 that explains the task. A column 64 can also be provided indicating priority level for each task, which is color coded to match corresponding due dates 65 on a displayed calendar 66.

While on screen 60, selecting the "Documents Due" entry 61 brings up a screen 70 (FIG. 7) for uploading documents and listing those documents 71 that have already been entered. Hovering over one of the document names 71 ("Photo of Roof Back") brings up a pop-up box 72 annotating the damage 73; selecting the document brings up an image of the document.

If all elements are agreed upon (block 118), the agreed-upon values are displayed, and the opposing party is notified of the settlement (block 119). Otherwise, the process by which the insurance company has arrived at its estimate, and the insured's request, are displayed, including a damage description, number of units, unit type (e.g., square footage), unit price, and total cost (block 120). For example, the insurance company in a roof damage case can be maintaining that only the front slope of the roof needs to be replaced, at a cost of $1500, and not the entire roof, as claimed by the insured, who is requesting $4500.

The insured can also be invited to submit a detailed estimate upon receipt of the insurance company's detailed estimate (block 121). Once both detailed estimates have been received, and the system 10 has performed its calculations, a dispute resolution report is displayed (block 122). Here the agreed-upon items are indicated, as well as those that are still under dispute and are still not awarded because of the respective levels of tolerance and confidential best offers. The system 10 can, if the parties' offers are close (block 123), request that the insurance company representative contact the insured to see whether an agreement could be reached (block 124; see box 63 on FIG. 6).

If agreement is not reached (block 125) in any of these methods, one or more of several other types of attempt can be made to reach agreement, wherein the parties can decide to attempt to resolve the case by one of several alternative methods (block 126): One way includes the preparation of another estimate, which can include accessing a plurality of software packages known in the art for performing estimates (block 127), and inputting the element data thereinto (block 128). A statistical comparison between the results is made (block 129), wherein widely ranging resultant estimates (block 130) generate an exception report (block 131); otherwise a statistically averaged composite estimate is output for consideration by the parties (block 132).

Another possible resolution method includes the hiring of an independent expert selected from a network of experts who have agreed not to accept any repair contracts from cases on which they serve as an expert (block 133). Such experts can include a roofer, an A/C repair person, a plumber, etc., and are selected based upon their area of expertise. In this case, the parties may agree to be bound by this expert's estimate (block 134) for the element in question.

Yet further alternate methods can include the appointment of a human claims assistant umpire to mediate, or the naming of an outside umpire to mediate (block 135).

Another possible use for the system 10 and method 100 can be directed to a statistical reporting function. In this feature, the results of the automated process are de-identified and sorted according to insurance company and/or policyholder representative (block 137), along with data relating to their "good faith" in negotiation based upon "good" initial confidential and/or published best offers (block 136). Such aggregated data could be forwarded to a State Insurance Commission (block 138), for example, or be used to inform future negotiations.

Thus it can be seen that the present system 10 and method 100 provide an efficient, automatic, objective rule-based process for settling claims based upon input from both parties without the intervention of a human mediator or arbitrator in the case in which various criteria are met. The system 10 and method 100 require far less time and resources than human intervention, and maintain a more dispassionate interaction between the parties.

The present system 10 and method 100 can also be used to automatically prepare a summary of the elements requiring resolution ahead of a meeting between the parties (blocks 101-115), and may even carry the process further through (the display of a dispute resolution report (block 122) or even to the offering of alternate dispute resolution methods (block 126). Thus, some of the elements may find agreement immediately, and a detailed report of the remaining elements clarified for the parties, thereby saving a great deal of time in "live" meetings between the parties and focusing the discussions on the elements that really require negotiation.

Another aspect of the present invention is directed to a task management system and method 200 (FIG. 8), which can be used independently or in concert with the system 10 and method 100 described above. The task management element 300 includes a software package 18 accessible by an adjuster via the insurance company computer 15 (block 201). An email template or other type of document template can be created or retrieved from the database 19 (block 202), and the template is then automatically populated with claims data (block 203) for the claim in question. The user enters into the document details on the activities he/she has completed (block 204), which are automatically entered into the appropriate database 19 fields (block 205). The document is sent to the client and/or printed and mailed to the client (block 206) and logged into the claim file (block 207). Time and expense data are automatically output to an invoice (block 208) or saved for a future invoice (block 209) via an accounting system such as known in the art.

The task management element 300 thus coordinates a plurality of efforts in one package, permitting a continuous flow of data entry and storage. Time is saved for the user, and errors caused by having to re-enter data into more than one document or screen are prevented. Further, the client can receive detailed information in a timely fashion, and immediately see the efforts for which he/she are being charged, and the details in the document are automatically entered into the claim file.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the system and method illustrated and described herein are by way of example, and the scope of the invention is not limited to the exact details of organization and use.

Having now described the invention, the organization, the operation and use of preferred embodiments thereof, and the advantageous new and useful results obtained thereby, the new and useful embodiments, and reasonable equivalents thereof obvious to those skilled in the art, are set forth in the appended claims.

What is claimed is:

1. A computer-implemented method for automatically settling an insurance claim made by a claimant and an insurer comprising:
    (a) receiving claims data electronically from each of a claimant and an insurer, the claims data comprising an initial settlement offer and a confidential best offer for damage to an insured item and using a processor to compare the received respective initial settlement offers and the confidential best offers;
    (b) if the confidential best offers of the claimant and the insurer overlap, automatically calculating a settlement amount within a range between the initial settlement offers and the confidential best offers of the claimant and the insurer;
    (c) electronically transmitting the settlement amount to the claimant and the insurer;
    (d) if the confidential best offers of the claimant and the insurer do not overlap, using the processor to calculate from a breakdown of a plurality of elements comprising the damaged item, each element having associated therewith an initial settlement offer and a confidential best offer, if the confidential best offers for an element overlap;
    (e) if the confidential offers for the element overlap, using the processor, automatically calculating a first element settlement amount within a range between the initial settlement offers and the confidential best offers for the element;
    (f) electronically transmitting the first element settlement amount to the claimant and the insurer and remaining elements for which the confidential offers do not overlap;
    (g) receiving from at least one of the claimant and the insurer a revised offer for at least one of the remaining elements;
    (h) if the revised offer overlaps with the confidential best offer of the other of the claimant and the insurer, using the processor, automatically calculating a second element settlement amount within a range between the revised offer and the confidential best offer of the other of the claimant and the insured for the element; and
    (i) electronically transmitting the second element settlement amount to the claimant and the insurer.

2. The method recited in claim 1, further comprising, following step (d):
    if the confidential offers for the element do not overlap, receiving an itemized calculation for the element from the claimant;

electronically transmitting the itemized calculation to the insurer; and receiving a revised offer from the insurer for the element.

3. The method recited in claim 2, further comprising receiving supporting documentation relating to the element from the claimant.

4. The method recited in claim 3, wherein the supporting documentation comprises at least one of a photograph, a receipt, and a work estimate from a repair company.

5. The method recited in claim 1, further comprising, following step (h), if the revised offer does not overlap with the confidential best offer of the other of the claimant and the insurer, automatically electronically transmitting an offer of an alternative dispute resolution method to the claimant and the insurer.

6. The method recited in claim 5, wherein the alternative dispute resolution method comprises:
   entering data into the processor on the damage to the insured item into a plurality of software packages for calculating a repair estimate therefor;
   using the processor to compare the calculated repair estimates;
   if the repair estimates calculated by the plurality of repair estimate software packages differ by more than a predetermined amount, using the processor to generate an exception report; and
   if the repair estimates calculated by the plurality of repair estimate software packages do not differ by more than the predetermined amount, using the processor to calculate an aggregated estimate and electronically transmitting the aggregated estimate to the claimant and the insurer.

7. The method recited in claim 5, wherein the alternative dispute resolution method comprises:
   engaging an independent expert to provide an estimate for repairing the insured item; and
   electronically transmitting the independent expert estimate to the claimant and the insurer.

8. The method recited in claim 5, wherein the alternative dispute resolution method comprises engaging a human mediator.

9. The method recited in claim 1, further comprising the step of electronically transmitting to the claimant and to the insurer a reminder of a task to be completed and a due date therefor.

10. The method recited in claim 1, wherein the claims data further comprise a narrative description of the damage to the insured item.

11. The method recited in claim 1, wherein the settlement amount comprises a raw settlement amount, and wherein the automatically calculating step (b) comprises using the processor to calculate a first and a second difference between the raw settlement amount and the initial settlement offers of the claimant and the insurer, respectively, and to weight a settlement amount toward the claimant or the insurer depending upon a lesser of the first and the second difference.

12. A system for automatically settling an insurance claim made by a claimant and an insurer comprising:
   a host processor having means for interfacing with a network, the network accessible by a claimant computer and an insured computer;
   a software package resident on the host processor comprising code segments adapted for:
   (a) receiving claims data from the claimant and insurer computers, the claims data comprising an initial settlement offer and a confidential best offer for damage to an insured item;
   (b) if the confidential best offers of the claimant and the insurer overlap, automatically calculating a settlement amount within a range between the initial settlement offers and the confidential best offers of the claimant and the insurer;
   (c) displaying the settlement amount to the claimant and the insurer via the claimant and insurer computers;
   (d) if the confidential best offers of the claimant and the insurer do not overlap, calculating from a breakdown of a plurality of elements comprising the damaged item, each element having associated therewith an initial settlement offer and a confidential best offer, if the confidential best offers for an element overlap;
   (e) if the confidential offers for the element overlap, automatically calculating a first element settlement amount within a range between the initial settlement offers and the confidential best offers for the element;
   (f) displaying via the claimant and insurer computers the first element settlement amount to the claimant and the insurer and remaining elements for which the confidential offers do not overlap;
   (g) receiving from at least one of the claimant and the insurer computers a revised offer for at least one of the remaining elements;
   (h) if the revised offer overlaps with the confidential best offer of the other of the claimant and the insurer, automatically calculating a second element settlement amount within a range between the revised offer and the confidential best offer of the other of the claimant and the insured for the element; and
   (i) displaying via the claimant and insurer computers the second element settlement amount to the claimant and the insurer.

13. The system recited in claim 12, wherein the software package further comprises, following code segment (d), code segments for:
   if the confidential offers for the element do not overlap, receiving an itemized calculation for the element from the claimant computer;
   displaying the itemized calculation to the insurer via the insurer computer; and
   receiving a revised offer from the insurer computer for the element.

14. The system recited in claim 13, wherein the software package further comprises a code segment for receiving supporting documentation relating to the element from the claimant computer.

15. The system recited in claim 14, wherein the supporting documentation comprises at least one of a photograph, a receipt, and a work estimate from a repair company.

16. The system recited in claim 12, wherein the software package further comprises, following code segment (h), a code segment for, if the revised offer does not overlap with the confidential best offer of the other of the claimant and the insurer, automatically offering an alternative dispute resolution method to the claimant and the insurer via the claimant and insurer computers, respectively.

17. The system recited in claim 16, wherein the offered alternative dispute resolution method comprises a code segment for:
   receiving data on the damage to the insured item;
   transmitting the received data into a plurality of software packages for calculating a repair estimate therefor;
   receiving repair estimates calculated by the plurality of software packages;

if the repair estimates calculated by the plurality of repair estimate software packages differ by more than a predetermined amount, generating an exception report; and if the repair estimates calculated by the plurality of repair estimate software packages do not differ by more than the predetermined amount, calculating an aggregated estimate and displaying the aggregated estimate to the claimant and the insurer.

18. The system recited in claim 16, wherein the offered alternative dispute resolution method comprises a code segment for:

retrieving data on an independent expert to provide an estimate for repairing the insured item;

receiving an estimate from the independent expert;

displaying the independent expert estimate to the claimant and the insurer.

19. The system recited in claim 16, wherein the software package further comprises a code segment for providing to the claimant and to the insurer a reminder a task to be completed and a due date therefor via the claimant and insurer computers, respectively.

20. The system recited in claim 12, wherein the settlement amount comprises a raw settlement amount, and wherein the automatically calculating code segment (b) comprises a code segment for determining a first and a second difference between the raw settlement amount and the initial settlement offers of the claimant and the insurer, respectively, and weighting a settlement amount toward the claimant or the insurer depending upon a lesser of the first and the second difference.

* * * * *